(12) United States Patent
Mauro

(10) Patent No.: US 7,891,111 B2
(45) Date of Patent: Feb. 22, 2011

(54) GONIOMETER

(76) Inventor: George Edward Mauro, 16 Northwestern Dr., Salem, NH (US) 03079

( * ) Notice: Subject to any disclaimer, the term of this patent is extended or adjusted under 35 U.S.C. 154(b) by 0 days.

(21) Appl. No.: 12/643,586

(22) Filed: Dec. 21, 2009

(65) Prior Publication Data

US 2010/0162580 A1 Jul. 1, 2010

(51) Int. Cl.
*B23Q 16/00* (2006.01)
(52) U.S. Cl. .......................... 33/569; 33/1 M
(58) Field of Classification Search ............. 33/573, 33/568–570, 1 M; 269/60, 75
See application file for complete search history.

(56) References Cited

U.S. PATENT DOCUMENTS

| | | | | |
|---|---|---|---|---|
| 3,244,393 A | * | 4/1966 | Wallerstein, Jr. | 248/569 |
| 3,638,933 A | * | 2/1972 | Burnette et al. | 269/60 |
| 4,113,223 A | * | 9/1978 | Kakizaki | 248/430 |
| 4,772,109 A | * | 9/1988 | Cutburth et al. | 359/393 |
| 4,934,671 A | * | 6/1990 | Laninga et al. | 269/20 |
| 6,083,333 A | * | 7/2000 | Van Beers et al. | 156/73.1 |
| 6,232,736 B1 | * | 5/2001 | Bullen | 318/575 |
| 6,347,458 B1 | * | 2/2002 | Kaczynski | 33/503 |
| 6,442,851 B1 | * | 9/2002 | Botos et al. | 33/1 N |
| 6,705,019 B2 | * | 3/2004 | Mauro | 33/569 |

* cited by examiner

*Primary Examiner*—G. Bradley Bennett
*Assistant Examiner*—Tania C Courson
(74) *Attorney, Agent, or Firm*—Davis & Bujold, P.L.L.C.

(57) ABSTRACT

A goniometer including an arcuate rotor plate rotatable about an axis of motion spaced apart from the rotor plate for supporting a device and a base having an arcuate base plate The rotor is rotationally coupled to the base by shaft and a resilient shaft bearing mounting exerting a resilient force on the shaft to maintain a positive engagement between the roller and rotor body.

16 Claims, 9 Drawing Sheets

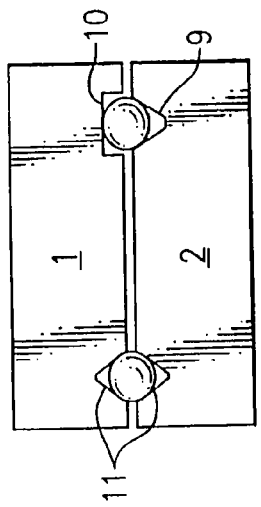
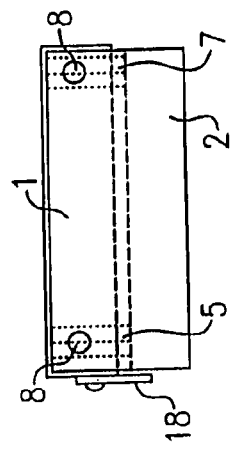
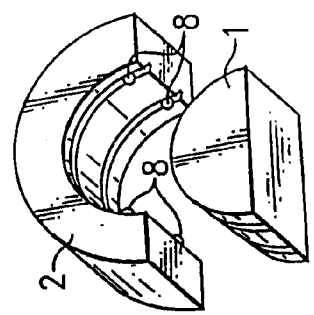
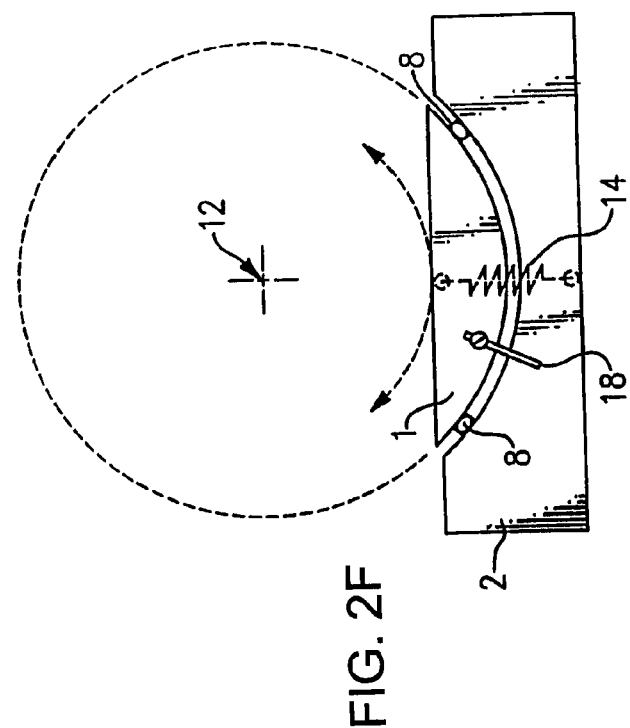
FIG. 2G(a)
FIG. 2G(b)
FIG. 2H
FIG. 2F

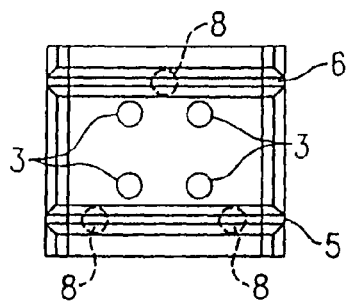
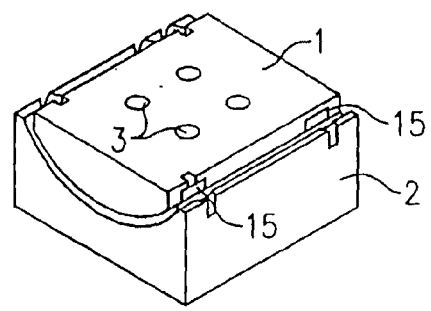
FIG. 2O  FIG. 2P
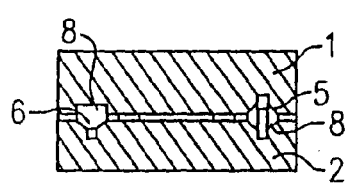
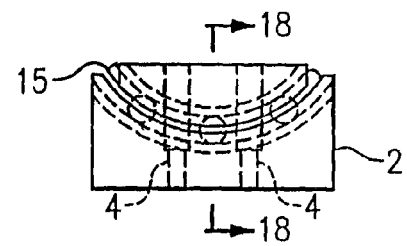
FIG. 2Q  FIG. 2R
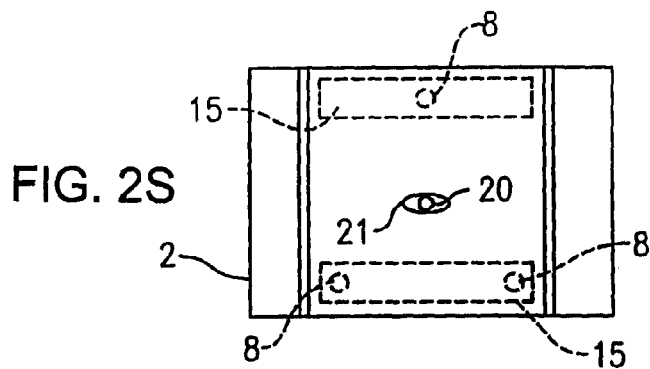
FIG. 2S
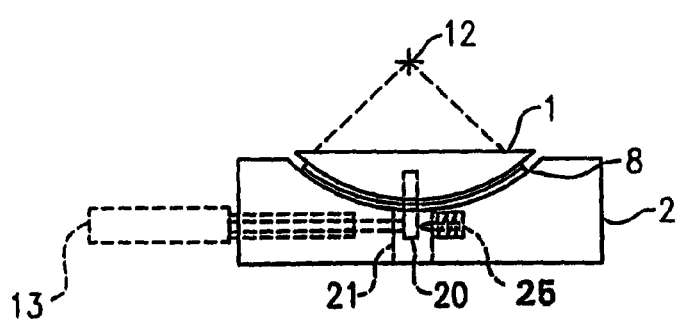
FIG. 2T

GONIOMETER

The present Patent Application is related to International Application No. PCT/US02/02648 filed Jan. 30, 2002 and U.S. Provisional Patent Application No. 60/267,274 filed Feb. 8, 2001.

FIELD OF THE INVENTION

This invention relates to precision, adjustable goniometers and, in particular, to a rotational positioner whose center of rotation is located, for the most part, outside the physical boundaries of the device, or wherein its entire rotational axis is orthogonally accessible over some angular span, unobstructed by the device's own hardware. It is used for partial rotation of parts too large for the thru hole of a full rotational stage.

BACKGROUND OF THE INVENTION

Partial rotation or arcuate positioners are known in the prior art and typically employ arcuate rolling bearings in which balls, spaced by cages, roll in opposed arcuate gothic arch shaped tracks allegedly providing a four-point contact surface. Current designs typically comprise stages mounted for limited rotation and controlled by a guide arrangement, such as arcuate dovetail mating grooves or arcuate cross-roller arrangements with cooperating v-grooves. Dovetail mating arrangements, however, do not provide negligible eccentricity coupled with smooth sensitive action and is inadequate, for example, for fiber optic alignment, and while cross rollers address such problems, cross rollers are difficult to assemble and align and are relatively expensive, even for critical fiber optic alignment applications.

In a related problem of the prior art, the goniometer rotor plate to which a device or instrument to be rotationally positioned is mounted is typically mechanically coupled to the goniometer base, which also serves as a reference plane, by means of a gear mechanism, such as a screw thread or pinion gear and a toothed rack, by which the angle of the rotor plate relative to the base is adjusted. Due to irregularities in, for example, the shape of or mechanical relationship between the toothed rack and the pinion gear or screw thread or irregularities or imperfections in the shape of the gear and rack teeth, however, there is typically a degree of slippage, backlash or errors in the positioning and rotation of the rotor plate with respect to base. These mechanical tolerances often result in an unacceptable degree of error in positioning the rotor plate and often allow the rotor plate some degree of movement independently of the rack and gear mechanism, which is again typically unacceptable

OBJECTS OF THE INVENTION

An object of the present invention is to provide a number of designs of goniometers which allow miniaturization and overcome shortcomings and excessive expense of current designs.

As will be described in the following detailed description of the invention, the goniometer mechanism of the present invention does not require an arcuate mating surface at the goniometer base, which in certain embodiments can be nothing more than at least three points integrated to mate with goniometer rotor plate grooves and allowing a friction-way (non-ball) rotation. In embodiments employing mating ball bearings mounted in ball bearing grooves, the present invention allows ball bearing grooves to have machining imperfections and/or minor mismatches without impairing the integrity or sensitivity of angular adjustment of the rotor plate.

SUMMARY OF THE INVENTION

The goniometer of the present invention includes a rotor plate for supporting a device or instrument wherein the rotor plate is rotatable about an axis of motion spaced apart from the rotor plate, and a base having an arcuate base plate supporting the rotor plate and allowing the rotor plate to rotate about the axis of rotation.

The goniometer includes a rotor plate for supporting a device or instrument wherein the rotor plate is rotatable about an axis of motion spaced apart from the rotor plate and has a path of rotation along a circumference of a circle centered on the axis of rotation and a base plate having bearing elements engaging with bearing surfaces of the rotor plate and supporting the rotor plate to allow the rotor plate to rotate about the axis of rotation. The goniometer further includes a drive mechanism coupling the rotor plate to the base plate to rotate the rotor plate along the path of rotation along the circumference of the circle centered on the axis of rotation and a resilient bias mechanism mounted to the base and engaging a bias surface of the roller plate to resiliently bias the roller plate into engagement with the base plate.

In further embodiments, the goniometer drive mechanism includes a drive roller frictionally engaging the bias surface of the roller plate or a pinion gear mounted onto a driven shaft mounted to the base plate and a rack mounted to the bias surface of the rotor plate. The drive mechanism may alternately comprise a threaded rotating shaft engaging a drive lever extending from the roller plate along a radius of the axis of rotation to cause axial motion of the drive lever along the rotating threaded shaft and corresponding rotation of the rotor plate along the path of rotation along the circumference of the circle centered on the axis of rotation.

The bias mechanism may include a bearing assembly supporting the drive roller and resiliently engaging the base plate by a bearing mount including a resilient element interacting with the base plate to resiliently bias the bearing assembly and the drive roller toward the base plate. Alternately, the bias mechanism may comprise a bearing assembly supporting the drive roller and resiliently engaging the base plate by a bearing mount including a bushing of resilient material located between the base plate and the and bearing assembly, thereby resiliently biasing the bearing assembly and the drive roller toward the base plate.

The precision adjustable goniometer of the present invention may further include an anti-backlash drive mechanism that includes an actuator flag extending from the roller plate generally along a radius passing through axis of rotation, a drive screw generally tangent to and spaced apart from the circumference of the circle defined by the rotational path of rotor plate and oriented at an oblique angle with respect to the actuator flag, a lead nut located on a first side of the actuator flag, the lead nut being non-rotationally coupled to the drive screw and axially translatable along the drive screw by rotation of the drive screw, and a compression spring and a plunger located on a second side of the actuator flag and coaxial with the drive screw, a first end of the compression spring exerting a resilient bias force on the plunger and the plunger exerting the resilient bias force on the second side of the actuator flag and a second end of the compression spring bearing against a rest axially fixed with respect to the drive screw.

An alternate embodiment of an anti-backlash drive mechanism includes an actuator flag extending from the roller plate generally along a radius passing through axis of rotation, a drive screw generally tangent to and spaced apart from the circumference of the circle defined by the rotational path of rotor plate and oriented at an oblique angle with respect to the actuator flag, and a lead nut located on a first side of the actuator flag, the lead nut being non-rotationally coupled to the drive screw and axially translatable along the drive screw by rotation of the drive screw. A pre-load spring and a non-rotating sleeve are located on a second side of the actuator flag and coaxial with the drive screw, a first end of the pre-load spring exerting a resilient bias force on the non-rotating sleeve and the non-rotating sleeve exerting the resilient bias force on the second side of the actuator flag and a second end of the pre-load spring bearing against a take-up slave nut restrained from rotation with the drive screw.

In presently preferred embodiments of the anti-lash drive mechanism at least one of mating faces of at least one of the actuator flag and the plunger or non-rotating sleeve and at least one of the actuator flag and lead nut are curved to permit smooth rotation along at least one of the mating faces of at least one of the actuator flag and the plunger or non-rotating sleeve and at least one of the actuator flag and lead nut.

BRIEF DESCRIPTION OF THE DRAWINGS

Various embodiments of the invention will now be described, by way of example, with reference to the accompanying drawings, in which:

FIG. 2F is a diagrammatic side elevation of a second embodiment of a four-ball goniometer according to the present invention;

FIG. 2G(*a*) is an illustrative cross-section of the arcuate groove arrangement of the embodiment of FIG. 2F;

FIG. 2G(*b*) is a diagrammatic end elevation of the second embodiment of FIG. 2F;

FIG. 2H is an illustrative inverted perspective view showing the arcuate grooves and four balls of the embodiment of FIG. 7;

FIG. 2O is a diagrammatic top view of a first embodiment of a three ball goniometer according to the present invention;

FIG. 2P is a perspective view of the embodiment of FIG. 2O;

FIG. 2Q is a diagrammatic side elevation of the embodiment of FIG. 2O;

FIG. 2R is a cross-section taken on section line 18-18 of FIG. 2Q;

FIG. 2S is a diagrammatic top view of a second embodiment of a three ball goniometer according to the present invention;

FIG. 2T is a diagrammatic side elevation of the embodiment of FIG. 2S;

DETAILED DESCRIPTION OF THE INVENTION

As described, the goniometer of the present invention is an improvement of a generally related goniometer described in International Application No. PCT/US02/02648 and related U.S. Patent Application No. 60/267,274, the disclosures of which are incorporated herein by reference.

The following descriptions of various embodiments and implementations of goniometers according to the present invention will first describe the basic elements, structures and principles of a goniometer according to the present invention, and will then describe various implementations and embodiments of goniometers incorporating the basic structures and principles of the present invention.

Figure 1A:
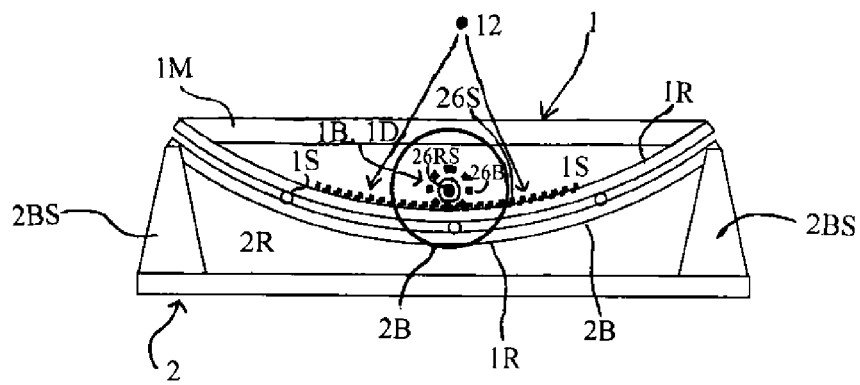
FIGS. 1A-1F are diagrammatic illustrations of a goniometer employing a resilient frictional rotational drive and bias mechanism.
Figure 1B:
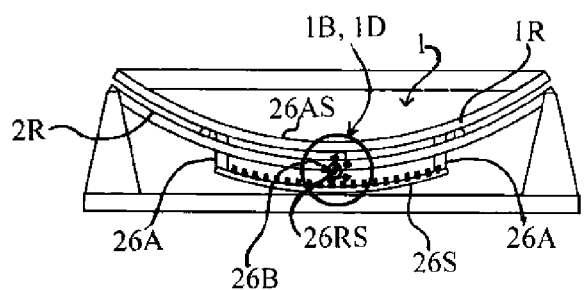
Figure 1C:
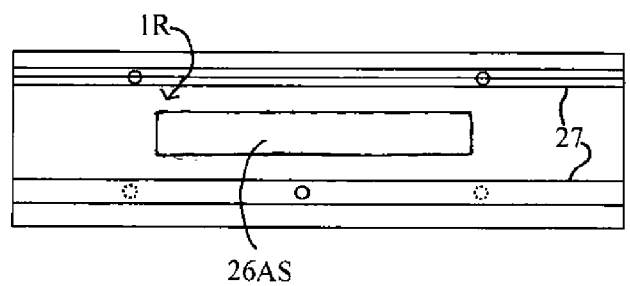

Referring first to FIGS. 1A-1J in general, therein are illustrated aspects of embodiments of a goniometer the present invention employing a resilient bias mechanism to maintain engagement between a rotor and a support base during rotation of the rotor about an axis of rotation and a drive mechanism for rotationally positioning the rotor and thus a device mounted to the rotor. FIGS. 1A-1F illustrate an embodiment employing a resilient bias and frictional rotational drive mechanism wherein FIGS. 1A and 1B are diagrammatic side elevations of embodiments of a goniometer of the present invention, FIG. 1C is a bottom view of a rotor plate 1 for a three support point, two track embodiment of a goniometer of the present invention employing a friction drive mechanism to rotate a rotor to which a device of instrument is mounted about a center of rotation spaced apart from the rotor.

Figure 1D:
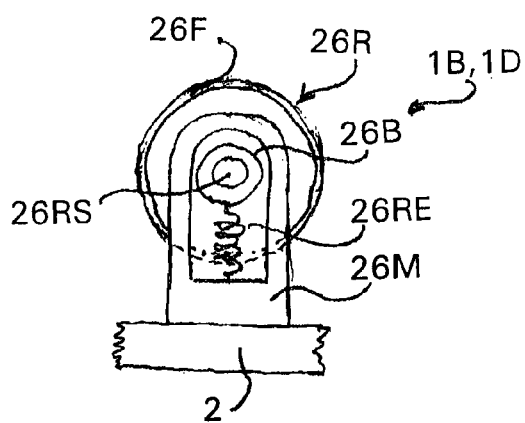
Figure 1E:
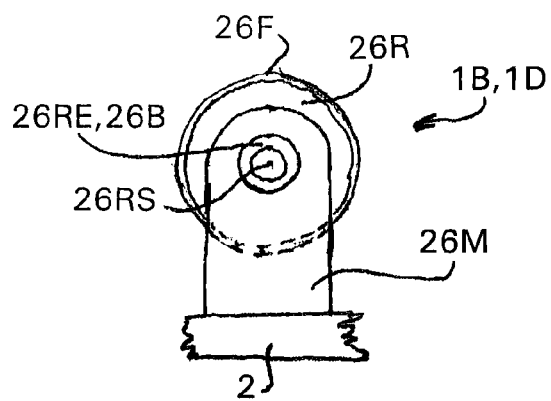
Figure 1F:
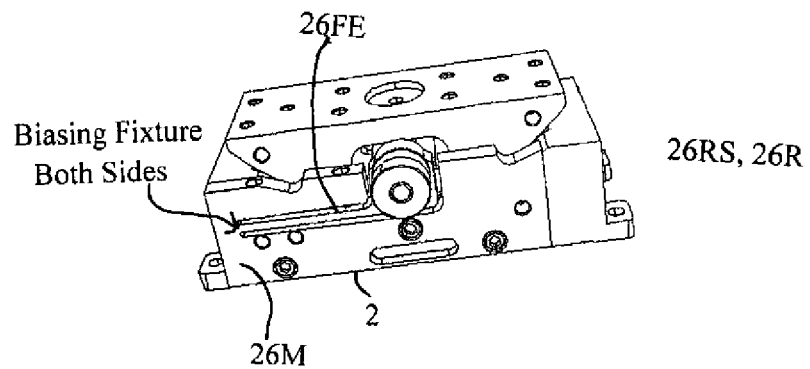

FIGS. 1D and 1E, in turn, are diagrammatic representations of a resilient biasing mechanism 1B and drive mechanism 1D for resiliently biasing the rotor into supported rotational contact with a base, with FIG. 1D illustrating a resilient bias mechanism 1B employing a spring and FIG. 1E illustrating a resilient bias mechanism 1B and drive mechanism 1D employing a resilient bushing or bias cylinder. FIG. 1F, in turn, is an isometric view of a goniometer of the present invention wherein resilient bias mechanism 1B is embodied as a flexure element.

Figure 1G:
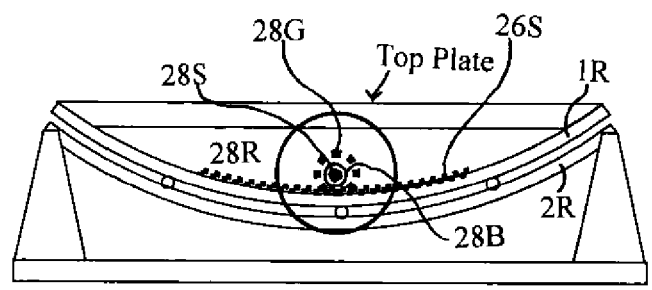
FIGS. 1G and 1H are diagrammatic illustrations of a goniometer employing a rack and pinion drive and bias mechanism.
Figure 1H:
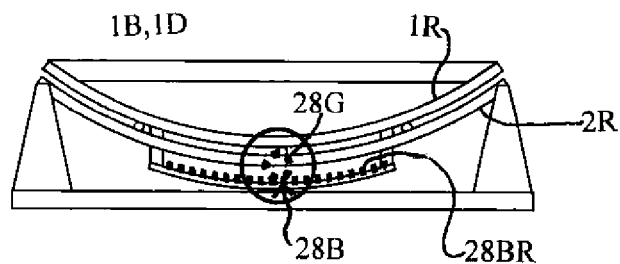
Figure 1I:
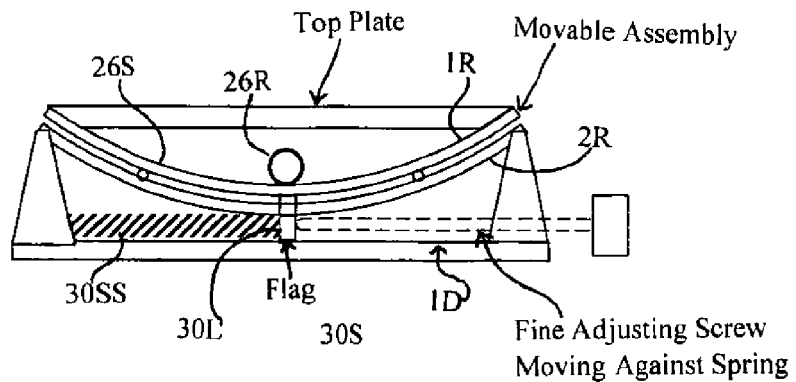
FIGS. 1I, 1J and 1K are diagrammatic illustrations of a goniometer employing a drive mechanism separate from the bias mechanism.
Figure 1J:
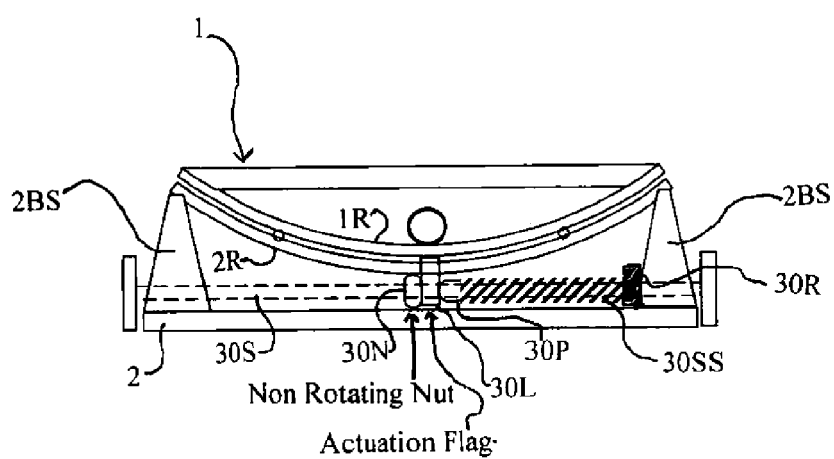

As will be discussed in the following, FIGS. 1G and 1H illustrate embodiments of the present invention employing a rack and pinion drive mechanism providing resilient biasing of the rotor toward the support plate, and FIGS. 1I and 1J illustrate embodiments employing a drive mechanism separate from the bias mechanism.

Referring first to exemplary embodiments of a goniometer of the present invention employing a resilient frictional rotational drive and bias mechanism as shown in FIGS. 1A-1J, a goniometer of the present embodiment again includes a rotor 1 for rotatably supporting a device or instrument and a base 2 supporting the rotor 1 and allowing the rotor 1 to rotate about an axis of rotation 12, thereby rotating the device or instrument about the axis of rotation 12.

In the present exemplary embodiments illustrated in FIGS. 1A-1J, rotor 1 includes a rotor plate 1R that in the illustrated embodiment has a cross section comprising an arcuate section of the circumference of a circle centered on an axis of rotation 12. A structure, illustrated generally as a rotor mounting plate 1M, is spaced apart from and mounted or attached to rotor plate 1R for the attachment and rotational support of a device or instrument that is to be mounted to the rotor 1.

Base 2, in turn, includes a base plate 2R which, in the illustrated embodiments shown in FIGS. 1A-1J, also has a cross section comprising an arcuate section of the circumference of a circle centered on axis of rotation 12, and a support structure, illustrated generally as base supports 2BS, fixedly supporting arcuate base plate 2R. Rotor plate 1R and a device or instrument mounted thereto by rotor mounting plate 1M thereby rotate about axis of rotation 12 and within the circumferential plane defined by actuate base plate 2R.

As illustrated in FIGS. 1A and 1B, and as described above with respect to other embodiments of a goniometer of the present invention, rotor plate 1R and base plate 2R are maintained in an aligned, radially spaced apart, adjacent relationship by means of bearing elements 2B engaging corresponding bearing surfaces 1S of rotor plate 1R. FIG. 1A illustrates an embodiment wherein bearing elements 2B are comprised, for example, of roller or ball bearings while FIG. 1B illustrates an embodiment wherein bearing elements 2B are comprised of protrusions having bearing surfaces in supportive contact with bearing surfaces 1S of rotor plate 1R. Bearing surfaces 1S are illustrated in FIGS. 1A-1C as comprised, for example, of v-shaped, u-shaped or flat arcuate tracks 2T, and it will be recognized that bearing surfaces 1S of rotor plate 1R may alternately be comprised simply of portions of the bottom surface of rotor plate 1R, thereby requiring, however, that rotor plate 1R be maintained in rotational alignment with arcuate base plate 2R by a means other than tracks 2T, such as retaining elements.

It must also be recognized with respect to any of the embodiments of a goniometer of the present invention described herein that neither the lower face of rotor plate 1R nor the upper face of base plate 2R be of arcuate shape or profile. It is only necessary that bearing elements 2B of base plate 2R and bearing surfaces 1S of rotor plate 1R be disposed along an arcuate section of the circumference of a circle centered on axis of rotation 12 to thereby define the path of rotation of rotor 1 and any device mounted thereto. These and yet other forms and arrangements of bearing elements 2B and tracks 2T are described in detail in following descriptions of goniometers of the present invention.

As further illustrated in FIGS. 1A and 1B, rotatable rotor plate 1R is resiliently based into contact with arcuate base plate 2R and base 2 by a resilient biasing mechanism 1B which provides a uniform pressure or force acting on rotatable rotor plate 1R in a direction radially away from axis of rotation 12 to force direct engagement between bearing elements 2B and bearing surfaces 1S. The resilient biasing force provided by resilient biasing mechanism 1B is designed to exert on rotatable rotor plate 1R a resilient force that is only radial with respect to axis of rotation 12, without any form of off-radius directional biasing component due, for example, to an off-angle biasing force.

Rotatable rotor plate 1R is rotationally driven about axis of rotation 12 by a drive mechanism 1D comprised, for example, of a bias/drive surface 26S on the roller plate 1R and engaging with a bias/drive roller 26R that is mounted to base 2 by means of a roller shaft 26RS and bearing assembly 26B. In the embodiment illustrated in FIG. 1A, drive mechanism 1D is effectively combined with resilient biasing mechanism 1B and includes bias/drive surface 26S, which is an upward facing element that is part of an upper surface of rotor plate 1R or an element mounted to the upper surface of rotor plate 1R, that is, on the side of rotor plate 1R facing axis of rotation 12. Bias/drive roller 26R is likewise mounted above, that is, toward axis of rotation 12, with respect to rotor plate 1R and bias/drive surface 26S, with bias/drive roller 26R being mounted to base 2 and resiliently biased into engagement with bias/drive surface 26S by means of roller shaft 26RS and bearing assembly 26B.

In an alternate embodiment illustrated in FIG. 1B, bias/drive surface 26S is mounted below arcuate base plate 2R, that is, outside of the arcuate planes defined by rotor plate 1R and arcuate base plate 2R with respect to axis of rotation 12. As indicated generally in FIG. 1B, bias/drive surface 26S is attached to rotor plate 1R by means of attachment elements 26A which extend between bias/drive surface 26S and rotor plate 1R through an appropriate opening, such as a attachment slots 26AS, in arcuate base plate 2R. Again, rotor plate 1R is resiliently biased into rotational engagement with bias/drive surface 26S by means of roller shaft 26RS and bearing assembly 26B. In this embodiment, bearing assembly 26B is again attached to or mounted into or on base 2 but roller shaft 26RS is in this embodiment located between rotor plate 1R and arcuate base plate 2R.

Referring to FIGS. 1D and 1E, therein are shown a diagrammatic illustrations of resilient biasing mechanisms 1B and drive mechanisms 1D wherein FIG. 1D illustrates a resilient bias mechanism 1B and drive mechanism 1D employing a spring and FIG. 1E illustrating a resilient bias mechanism 1B and drive mechanism 1D employing a resilient bushing or bias cylinder.

In the spring embodiment illustrated in FIG. 1D, bearing assembly 26B, which supports roller shaft 26RS and bias/drive roller 26R, is resiliently engaged with base 2 by means of a bearing mount 26M that includes a resilient element 26RE, such as a spring, that interacts with base 2 to resiliently urge bearing assembly 26B and thus roller shaft 26RS toward arcuate base plate 2R. Roller shaft 26RS thereby resiliently biases bias/drive roller 26R toward arcuate base plate 2R, which in turn bears on bias/drive surface 26S of rotor plate 1R to resiliently bias rotor plate 1R into an engaged relationship with arcuate base plate 2R and base 2.

In the alternate embodiment illustrated in FIG. 1E, resilient element 26RE may be comprised, for example, of a bushing of resilient material located between base 2 and bearing assembly 26B and thereby resiliently supporting and biasing bearing assembly 26B and thereby shaft 26S and bias/drive roller 26R toward arcuate base plate 2R. Again, bias/drive roller 26R bears on bias/drive surface 26S of rotor plate 1R, thereby resiliently biasing rotor plate 1R into an engaged relationship with arcuate base plate 2R and base 2 with respect to base 2.

In the alternate embodiment illustrated in FIG. 1F, resilient element 26RE of resilient bias mechanism 1B is embodied as a flexure element 26FE, that is, as a resilient arm secured at one end to a bearing mount 26M, such as a side plate mounted to base 2, and at the opposing free end of the arm supporting, for example, roller shaft 26RS of a bias/drive roller 26R wherein, in a typical embodiment, each end of roller shaft 26RS of a bias/drive roller 26R will be supported by a corresponding flexure element 26FE.

Next considering drive mechanism 1D, and as indicated in FIGS. 1D and 1E, bias/drive roller 26R is mounted to roller shaft 26RS to rotate with roller shaft 26RS and is provided with a frictional surface 26F bearing against and frictionally engaging with bias/drive surface 26S of rotor plate 1R. The rotation of roller shaft 26RS will thereby, by rotation of bias/drive roller 26R, rotate rotor plate 1R and rotor 1 and thus a device mounted thereto through a corresponding angular rotation around axis of rotation 12. In this regard, it should be noted that frictional surface 26F may be comprised of a resilient material and thereby, in place of a spring or resilient bushing, comprise the resilient member 26RE resiliently biasing rotor plate 1R into an engaged relationship with arcuate base plate 2R and base 2 with respect to base 2.

It will thereby be apparent that the resilient engagement of bearing mount 26M with base 2 thereby insures a positive engagement between rotor plate 1R and rotor 1 and base plate 2R and base 2 throughout the full range of rotation of rotor plate 1R and rotor 1 and will adapt automatically to any irregularities or non-linearities in, for example, the shape or mechanical relationship between rotor 1, rotor plate 1R, base plate 2R or base 2.

Next referring to FIGS. 1G and 1H, which illustrate an embodiment employing a rack and pinion drive mechanism, this embodiment is generally similar to that described just above, but replaces the friction drive mechanism 1D with a resiliently biased rack and pinion drive mechanism 1D. FIGS. 1A-1E may be referred to, however, for a detailed description of the overall structure and operation of a goniometer of the present invention and the following discussions will focus on the rack and pinion drive mechanism.

As further illustrated in FIGS. 1G and 1H, in these embodiments rotatable rotor plate 1R is further rotationally coupled to stationary base 2 by a rotational positioning mechanism comprised, for example, of an upwardly facing rack 28R mounted to rotor plate 1R and a pinion gear 28G that is mounted to base 2 by means of a shaft 28S and bearing assembly 28B.

In the embodiment illustrated in FIG. 1G, arcuate rack 28R is mounted to the upper surface of rotor plate 1R, that is, on the side of rotor plate 1R facing axis of rotation 12, and pinion gear 28G and shaft 28S are likewise mounted above, that is, toward axis of rotation 12, with respect to rotor plate 1R and rack 28R with pinion gear 28G engaging rack 28R and bearing assembly 28B mounted to the structure of base 2.

In the alternate embodiment illustrated in FIG. 1H, arcuate rack 28R is mounted below rotor plate 1R, that is, outside of the arcuate planes defined by rotor plate 1R and arcuate base plate 2R with respect to axis of rotation 12. As indicated generally in FIG. 1B, arcuate rack 28R is attached to rotor plate 1R by means of rack attachment elements 28A, which extends between arcuate rack 28R and rotor plate 1R through an appropriate opening, such as a rack slot 28RS, in arcuate base plate 2R.

Again, rotatable rotor plate 1R is rotationally coupled to stationary base 2 by the engagement of rack 28R mounted to rotor plate 1R with pinion gear 28G that is mounted to base 2 by means of a shaft 28S and bearing assembly 28B. Bearing assembly 28B is again attached to or mounted into or on base 2 but shaft 28S is in this embodiment located between rotor plate 1R and arcuate base plate 2R with a portion of pinion gear 28G extending through rack slot 2RS if necessary.

Lastly with respect to the embodiments illustrated in FIGS. 1G and 1H, the resilient biasing mechanisms 1B and drive mechanisms 1D employed with the rack and pinion embodiments of a drive mechanism 1D may be and typically will be similar to those shown and described with reference to FIGS. 1D and 1E and therefore need not be described in detail at this point, having been described in detail herein above.

As will be appreciated by those of ordinary skill in the relevant arts, a resilient and adaptable continuous positive engagement between rack 28R, pinion gear 28G, shaft 28S and base 2 by means of bearing mount 28M and resilient element 28RE will significantly reduce any slippage, backlash or errors in the positioning and rotation of rotor plate 1R with respect to rack 28R and base 2, thereby significantly improving the accuracy and movement of rotor plate 1R and a device or instrument mounted thereto. Other embodiments of anti-backlash mechanisms will be described in following descriptions, however.

Figure 1K:
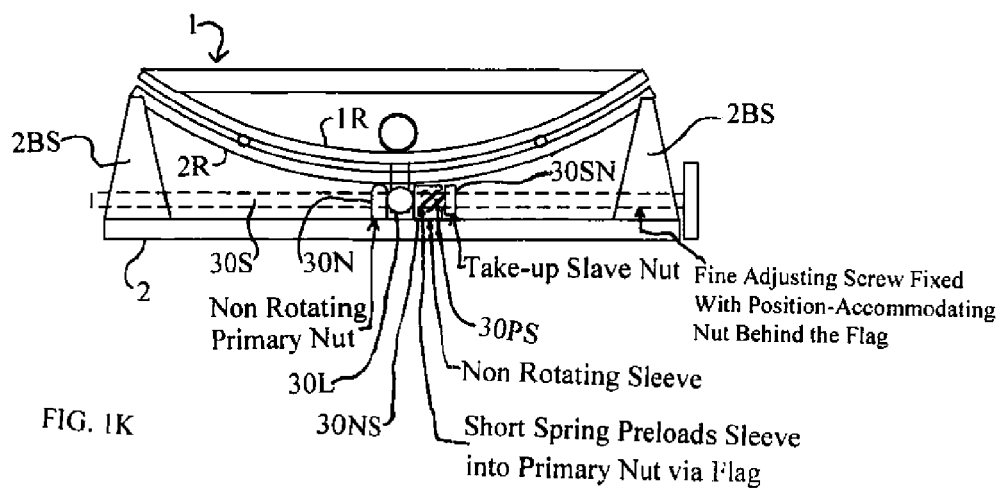

Referring now to FIGS. 1I, 1J and 1K, therein are illustrated alternate embodiments of resilient biasing mechanism 1B and drive mechanism 1D wherein drive mechanism 1D is separate from resilient biasing mechanism 1B, which again may be embodied in any of the forms described above as well as in other alternate forms.

In the embodiment illustrated in FIG. 1I, drive mechanism 1D is comprised of threaded drive screw 30S engaging a drive/indicator lever or "actuator flag" 30L attached to rotor plate 1R wherein actuator flag 30L is oriented along a radius passing through axis of rotation 12. Drive screw 30S, in turn, is oriented at an oblique angle, typically at or close to 90°, with respect to actuator flag 30L and thereby at an angle generally tangent to but spaced apart from the circumference of the circle defined by the rotational path of rotor plate 1R and centered on an axis of rotation 12. Drive screw 30S is engaged with actuator flag 30L by a threaded connection that allows drive screw 30S to rotate with respect to actuator flag 30L but causes actuator flag 30L to move axially along drive screw 30S according to direction and amount of rotation of drive screw 30L. The rotation of drive screw 30S thereby causes a circumferential angular displacement of actuator flag 30L with respect axis of rotation 12, and a corresponding rotation of rotor plate 1R about axis of rotation 12.

The threaded connection between drive screw 30S and actuator flag 30L may be, for example, in the form of a non-rotating nut affixed to actuator flag 30L or any other forms of non-rotating threaded connection between actuator flag 30L and drive screw 30S. As also indicated, the assembly may include a spring 30SS surrounding drive screw 30L and extending between the end of drive screw 30S at base 2 and the end of drive screw 30S at actuator flag 30L, thereby biasing base 2, drive screw 30S and actuator flag 30L into positive engagement with each other and thereby reducing backlash and the effects of tolerances in the assembly.

In the embodiment shown in FIG. 1I, one end of drive screw 30S is engaged with base 2 by a threaded connection so that drive screw 30S extends or retracts with respect to base 2 with the rotation of drive screw 30S and the second end of drive screw 30S abuts actuator flag 30L to cause axial movement of drive/indicator lever 30L, as described above. In this embodiment, actuator flag 30L is resiliently biased into engagement with drive screw 30S by a spring 30SS extending between the side of actuator flag 30L opposite drive screw 30S and a corresponding region of base 2.

The embodiment illustrated in FIG. 1J comprises an anti-backlash drive mechanism 1D that again includes an actuator flag 30L affixed to rotor plate 1R wherein actuator flag 30L is, in the embodiment of FIG. 1J, not coupled to drive screw 30S but is instead slidably displaceable along drive screw 30S. A lead nut 30N located on a first side of actuator flag 30L is threadedly coupled to drive screw 30S and slidably but non-rotatably engaged with base 2, such as by an engagement with a groove or ridge in or on base 2, so that lead nut 30N is translated axially along drive screw 30S by the rotation of drive screw 30S. A compression spring 30SS and plunger 30P are located on the second side of actuator flag 30L, opposite to lead nut 30N. One end of compression spring 30SS exerts a resilient force against plunger 30P, which in turn bears against actuator flag 30L, and the opposite end of compression spring 30SS bears against an axially fixed rest 30R which, for example, may be located at the end of drive screw 30S opposite actuator flag 30L or may be affixed to base 2 at a selected location along drive screw 30S.

As may be seen from FIG. 1J, therefore, compression spring 30SS acts through plunger 30P to exert a resilient force against actuator flag 30L to resiliently bias actuator flag 30L against lead nut 30N and in the direction away from a drive element 30E attached to the end of drive screw 30S supporting compression spring 30SS and plunger 30P, wherein drive element 30E may be, for example, a thumb knob or a gear of a motor drive train. The rotation of drive screw 30S will thereby cause a lateral motion of lead nut 30N along drive screw 30S, due to the threaded non-rotating coupling between lead nut 30N and drive screw 30S, in a direction determined by the direction of rotation of drive screw 30S. Compression spring 30SS and plunger 30P will keep actuator flag 30L in contact with lead nut 30N, so that actuator flag 30L is moved laterally along drive screw 30S, thereby rotating rotor 1 about axis of rotation 12 while taking up or eliminating backlash and looseness, or positional tolerance, in the mechanism.

Referring now to FIG. 1K, therein is illustrated an alternate embodiment of an anti-backlash drive mechanism 1D that again includes an actuator flag 30L affixed to rotor plate 1R wherein actuator flag 30L is slidably displaceable along drive screw 30S. A lead nut 30N is again located on a first side of actuator flag 30L and is again is threadedly coupled to drive screw 30S and slidably but non-rotatably engaged with base 2, such as by an engagement with a groove or ridge in or on base 2, so that lead nut 30N is translated axially along drive screw 30S by the rotation of drive screw 30S.

In this embodiment, a preload spring 30PS and a non-rotating sleeve 30NS are located on the second side of actuator flag 30L, opposite to lead nut 30N. One end of preload spring 30PS is enclosed within and exerts a resilient force against non-rotating sleeve 30NS, which in turn bears against actuator flag 30L and which is prevented from rotating with the rotation of drive screw 30S by, for example, a sliding non-rotating coupling between non-rotating sleeve 30NS and base 2. The opposite end of pre-load spring 30PS bears against a take-up slave nut 30NS, which is constrained from rotating with drive screw 30S by the frictional engagement between take-up slave nut 30SN and pre-load spring 30PS and the frictional engagement between pre-load spring 30PS and non-rotating sleeve 30NS.

As may be seen from FIG. 1K, therefore, pre-load spring 30PS acts through non-rotating sleeve 30NS to exert a resilient force against actuator flag 30L to resiliently bias actuator flag 30L against lead nut 30N and in the direction away from a drive element 30E attached to the end of drive screw 30S supporting compression spring 30SS and plunger 30P, wherein drive element 30E may be, for example, a thumb knob or a gear of a motor drive train. The rotation of drive screw 30S will thereby cause a lateral motion of lead nut 30N along drive screw 30S, due to the threaded non-rotating coupling between lead nut 30N and drive screw 30S, in a direction determined by the direction of rotation of drive screw 30S. Pre-load spring 30PS and non-rotating sleeve 30NS acting between take-up slave nut 30SN and actuator flag 30L will keep actuator flag 30L in contact with lead nut 30N, so that actuator flag 30L is moved laterally along drive screw 30S, thereby rotating rotor 1 about axis of rotation 12 while taking up or eliminating backlash and looseness, or positional tolerance, in the mechanism.

Lastly with regard to the anti-backlash drive mechanisms illustrated and described with reference to FIGS. 1I, 1J and 1K, it should be noted that a correct curvature in the faces of lead nut 30N and plunger 30P or non-rotating sleeve 30NS contacting actuator flag 30L or of the faces of actuator flag 30L contacting lead nut 30N and plunger 30P or non-rotating sleeve 30NS allows smooth anti-backlash operation and minimizes actuation non-uniformities over the range of operation of the mechanism. In other implementations, such curvature in the mating faces of lead nut 30N, plunger 30P, non-rotating sleeve 30NS and actuator flag 30L may be replaced by simple protrusions on the face of actuator flag 30L or lead nut 30N and plunger 30P or non-rotating sleeve 30NS may provide reasonably smooth actuator, and in certain instances a lack of curvature in the mating faces may provide adequate performance. It should also be noted that the locations of lead nut 30N, compression spring 30SS and plunger 30P or pre-load spring 30PS and non-rotating sleeve 30NS may be reversed with respect to the faces of actuator flag 30L and drive element 30E while providing the same operation and advantages as the implementation illustrated in FIG. 1J.

It must also be noted that roller shaft 26RS or drive screw 30S may be manually driven, such as by an attached knob, or motor driven by an attached motor and that, in the latter case, the motor may be mounted to base 2 by a gimbal to allow drive screw 30S and the motor to maintain as close as possible a tangential angle with respect to the circumference of the circle of rotation of rotor plate 1R and drive/indicator lever 30L.

Next considering various implementations, embodiments and arrangements for rotatingly supporting a rotor 1 on a base 2 for limited rotation about a center of rotation 12, typical rotational mountings for this purpose have been described in International Application No. PCT/US02/02648 and related U.S. Patent Application No. 60/267,274, which have been incorporated herein by reference. As described therein, such rotational mountings are typically comprised of balls retained in tracks in the mating faces of an arcuate rotor plate 1R and a corresponding arcuate base plate 2R and may be comprised of various combinations of three and four balls and two or three tracks, as will be described in detail in the following descriptions or various four and three ball mountings.

Referring therefore to FIGS. 2A-2E, as illustrated therein a rotor 1 is supported for limited rotation by a base 2. Through holes 3 are provided in the rotor 1 to allow access to base mounting holes 4 by which screws may mount the base 2 to a support structure. In this embodiment three parallel arcuate tracks 5, 6 and 7 engage four balls 8 with tracks 5 and 6 having opposed arcuate surfaces as shown in FIG. 2L and track 7 having an arcuate surface as shown in FIG. 1. In this arrangement the tracks 5 and 6 comprise a arcuate V-groove 9 in base 2 laterally locating the associated balls 8 and in engagement with a flat matching arcuate surface 10 defined by rotor 1 and track 7 has opposed arcuate V-grooves 11 laterally locating the associated ball 8 and in engagement with each other freedom of movement along these grooves as hereinafter described. Three of the balls 8 are arranged with two spaced apart in track 5 and one in track 6 all three being located by cages 15 while the fourth ball 8 is located in track 7 and is free to move along track 7 to find a position in which all four balls touch and support the rotor 1 on the base 2. By this means a smooth sensitive stable high load non-eccentric stage with a movement range typically of about 10° about the axis of rotation of the rotor is provided.

Figure 2A:
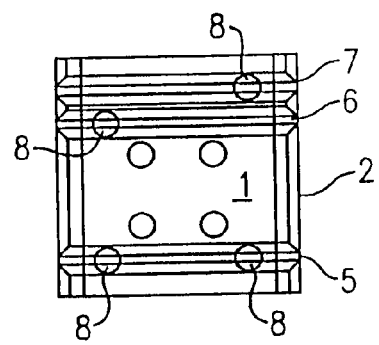
FIG. 2A is a diagrammatic top view of a first embodiment of a four ball goniometer according to the present invention.
Figure 2B:
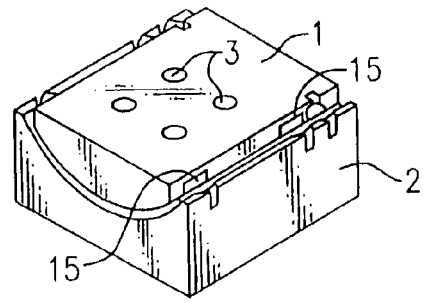
FIG. 2B is a perspective view of the embodiment of FIG. 2A.
Figure 2C:
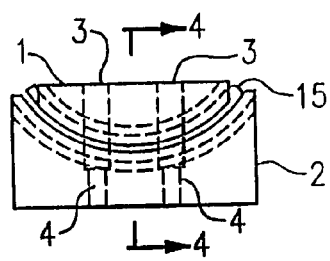
FIG. 2C is a diagrammatic side elevation of the embodiment of FIG. 2A.
Figure 2E:
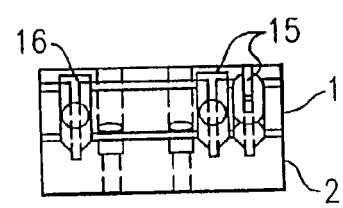
FIG. 2E is a diagrammatic end elevation of the embodiment of FIG. 2A.
Figure 2D:
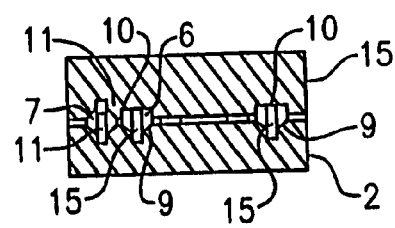
FIG. 2D is a cross-section taken on section line 4-4 of FIG. 2C.
Figure 2I:
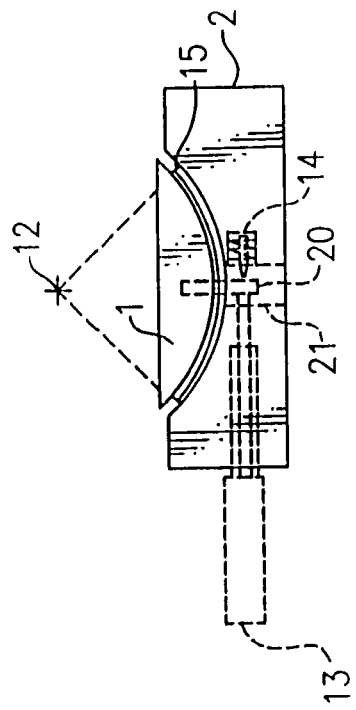
FIG. 2I is a diagrammatic top view of a third embodiment of a four ball goniometer according to the present invention.
Figure 2N:
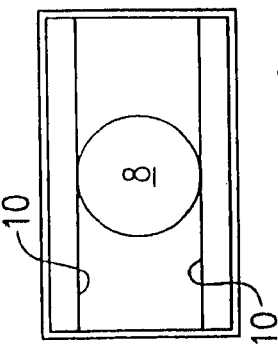
FIGS. 2K-2N are illustrative cross-sections of various arcuate groove arrangements referred to with respect to FIGS. 2H and 2I and FIGS. 2S and 2T.
Figure 2M:
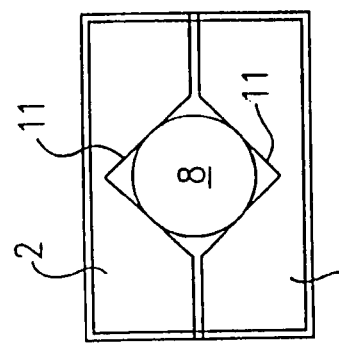

FIGS. 2G-2I refer to an alternative two track 17 arrangement which may be substituted for the three track arrangement of FIGS. 2A-2E. In FIG. 2G-2I one track is as illustrated in FIG. 2N while the other track is as illustrated in FIG. 2M. The arcuate flat surface 10 on one side of one of tracks permits the required rotation of the rotor about an axis normal to the axis of rotation 12 to achieve the necessary four point contact of the balls with the rotor 1 and base 2. An actuating mechanism 18 (motorized or manual) is operatively connected to rotor 1 to control movement about the axis 12. A spring 14 engages the rotor 1 and base 2 to bias these together in engagement with the balls 8.

This embodiment provides no adjustment along axis of rotation 12, however.

Figure 2J:
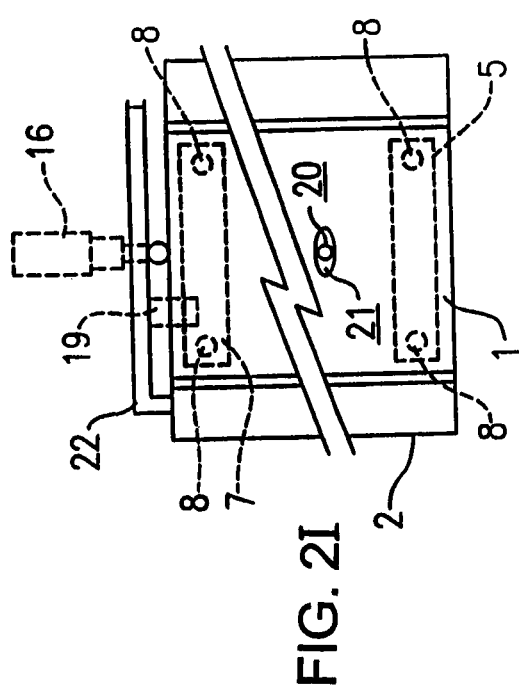
FIG. 2J is a diagrammatic side elevation of the embodiment of FIG. 10.
Figure 2L:
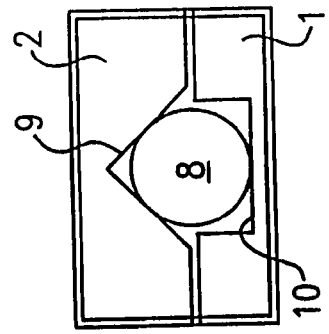

This four ball 8 arrangement is an example of the track configuration which may be utilized in the four ball embodiment of FIGS. 2I and 2J which illustrates a preferred four ball embodiment allowing an angular travel of the rotor 1 about the axis of rotation 12 typically of about 10° total under the spring 14 biased control of micrometer 13 or other actuator and, optionally, linear travel under the spring 19 biased control of micrometer 16 or other actuator. The spring 25 located in base 2 engages a pin 20 fast with the rotor 1 and moveable in an opening 21 against the bias of spring 25 by micrometer 13 to pivot the rotor 1, relative to the base, about axis 12. The spring 19 engages rotor 1 and a support 22 for micrometer 16 to allow linear movement of the rotor 1 relative to the base 2 along axis 12 against the bias of the spring 19 by operation of the micrometer 16. In the preferred form the arcuate grooves are either or both grooves shown in FIGS. 12 and 15.

To restrain longitudinal movement, a stop/micrometer support 22 may be placed at any convenient point against which the rotor may be pre-loaded. This "stop" may also be a ball placed up against a plate attached to the base, and free to rotate with the rotor Longitudinal movement may even be locked by having one of the balls captivated between 2 transaxial V-grooves, one in the rotor and one in the base 2.

Figure 2K:
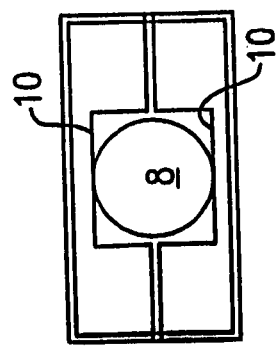

FIGS. 2K-2N illustrate four groove configurations of which those of FIGS. 2L and 2M have already been described above. In addition FIG. 2K illustrates a captivation (1) in which two flat opposed arcuate surfaces 10 having surface defining side walls oppose one another with a ball 8 between the surfaces and FIG. 2N illustrates a captivation (4) comprising two flat arcuate opposed surfaces 10 without surface defining side walls.

Possible configurations are
1) One ball with captivation 3 (FIG. 2M), and three balls 8 with captivation 1, 2 or 4 (FIG. 2K, 2L or 2N);
2) No longitudinal adjustment, with an external stop. Here four balls are used with any combination of captivations 1 and 4 (FIGS. 2K and 2N); and
3) Longitudinal adjustment is provided by micrometer or motor screw with four balls with any combination of captivations 1 and 4 (FIGS. 2K and 2N).

Captivation modules may be externally added rather than machined into the base 2 and rotor 1, to provide one or more of the grooves.

Additionally, external bearing housing segments may be transplanted into receivers to form captivation style 3 (FIG. 2M), with three of those segments being longitudinally free to find seating for the bearings, then i.e. bonded into those seating places as found.

Any combinations of these arrangements may be used.

Referring now to the three ball embodiments, reference is first made to FIGS. 2O-2R in which a rotor 1 is supported for limited rotation by a base 2. Through holes 3 are provided in the rotor 1 to allow access to base mounting holes 4 by which screws may mount the base 2 to a support structure. In this embodiment two parallel arcuate tracks 5 and 6 engage three balls 8 with tracks 5 and 6 having opposed arcuate surfaces as shown in FIGS. 2L and 2M respectively. The balls 8 two spaced apart in track 5 (FIG. 2M) and one located centrally in track 6 (FIG. 2L) are located by cages (15). By this means a smooth sensitive stable non-eccentric stage with a movement range typically of about 10° about the axis of rotation 12 of the rotor 1 is provided.

Now referring to FIGS. 2S and 2T a preferred 3 ball embodiment allowing an angular travel of the rotor 1 about the axis of rotation 12 typically of about 10° total under the spring 14 biased control of micrometer 13 or other actuator. The spring 14 located in base 2 engages a pin 20 fast with the rotor 1 and moveable in an opening 21 against the bias of spring 14 by micrometer 13 to pivot the rotor 1, relative to the base, about axis 12.

The goniometer of FIGS. 2S and 2T may be embodied in the same arrangements as described with reference to FIGS. 2K-2N above.

It will be appreciated that in tracks having an arcuate V-groove opposing flat arcuate surface the arcuate V-groove may be located in either the base 2 and the arcuate flat surface on or in the rotor 1 or vise-versa.

Except where freedom of movement of a ball 8 along its associated arcuate groove is required the balls 8 are located by retaining cages (i.e. cage 15 in FIG. 2S). Such retaining cages will be well known to those in the bearing arts.

Figure 2U:
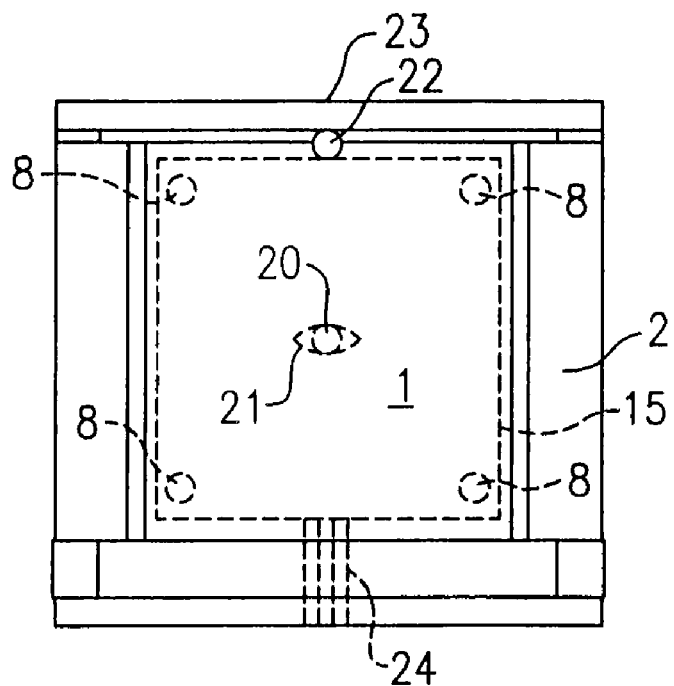
FIG. 2U is a diagrammatic top view of a four ball grooveless and trackless goniometer.
Figure 2V:
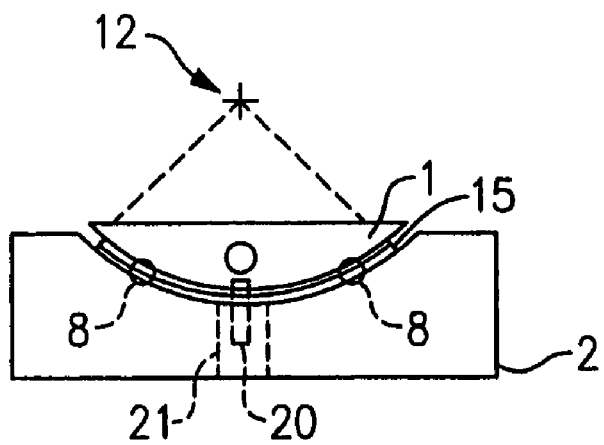
FIG. 2V is a diagrammatic side elevation of the goniometer of FIG. 2T.

The goniometer of FIGS. 2T and 2V has four balls 8 unconstrained by grooves or tracks. The balls 8 are retained by a cage 15, common to all four balls 8, to maintain ball pairs separated at desired spacings. As with the above described embodiments, this embodiment has a rotor 1 supported for limited rotation, about axis 12, on a base 2. As with FIGS. 2S and 2T a stop pin 20, in an opening 21, may be provided to facilitate manual or motorized actuation. A stop 22 (ball, roller or friction slide) supported by a stop support 23 is provided and a spring 24 is positioned to urge the rotor 1 against the stop support 23 by way of the stop 22. A possible variation permits the use of the track shown in FIG. 2J. It will be appreciated that the embodiment of FIGS. 2T and 2U is quite similar to the arrangement suggested by FIG. 2M which illustrates a captivation comprising two opposed flat arcuate surfaces without surface defining side walls.

Lastly, it will be noted that yet other adaptations and modifications may be made in the embodiments of the present invention illustrated in FIGS. 2A-2V and described herein above. Since certain changes may be made in the above described apparatus for fabricating three-dimensional models using a spray device without departing from the spirit and scope of the invention herein involved, it is intended that all of the subject matter of the above description or shown in the accompanying drawings shall be interpreted merely as examples illustrating the inventive concept herein and shall not be construed as limiting the invention.

For example, a stop may be placed at any convenient point against the rotor to restrain longitudinal movement of the rotor, wherein such a stop may be comprised, for example, of a ball placed up against a plate attached to the base, and free to rotate with the rotor. It should also be noted that the term "balls" as used herein is intended to be construed to include "rollers" in cases where the embodiment of the goniometer employs the arcuate flat surfaces shown in FIGS. 12 and 15.

Lastly, it will be noted that yet other adaptations and modifications may be made in the embodiments of the present invention illustrated in FIGS. 1A, 1B, 1C and 1D and described herein above.

For example, features of the implementations of a goniometer as described in International Application No. PCT/US02/02648 and related U.S. Patent Application No. 60/267,274 may be incorporated into the present invention, such as the use of either three or four bearing balls, two riding in counter-v-grooves at least one of which is a V-groove opposed to a non-constraining flat surface, to give complete kinematic stability in every aspect except rotation.

In this regard, it will be recognized that the design with the three ball bearings is the simplest and this affords a three-point contact for low load requirements wherein the three balls are constrained to follow arcuate paths to provide rotation of the rotor, relative to the support base, about an axis of rotation external to the rotor, the three balls being constrained to be spaced apart in at least two dimensions to ensure a three point spaced contact with the rotor and the support base. The four-ball version, in turn, allows perfect four-point contact wherein the rotor is free to rotate on its axis normal to the axis of rotation of the device until all four points are touched simultaneously. In this implementation, the four balls are constrained to follow arcuate paths to provide rotation of the rotor, relative to the support base, about an axis of rotation external to the rotor, with the four balls being constrained to be spaced apart in at least two dimensions with at least one ball thereof being supported to adjust its position to ensure a four point spaced apart support contact between the rotor and the support base. The four ball embodiment may also be implemented with a cylinder that is very long as compared to the diameter and in two sections, which could allow a very lightweight off-axis tilt table.

In further consideration of alternate embodiments of the present invention using features from International Application No. PCT/US02/02648 and related U.S. Patent Application No. 60/267,274, the goniometer may be implemented with two parallel spaced apart said arcuate grooves with at least one arcuate groove being formed by facing cooperating V-grooves and the other defined by the rotor and the support base with two balls being retained in a spaced apart relationship in laterally constrained contact with said V-grooves. A possible further version employs pre-fabricated bearing races, cut into sections for partial rotation, as separate parts attached to receiving areas in the goniometer body, rather than machining them right in. This allows the design to eliminate the third groove pair, while the second groove pair manages its former operation by having the attributes of both groove pairs built into one.

Therefore, since certain changes may be made in the above described apparatus without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. A precision adjustable goniometer, comprising:
   a rotor plate for supporting a device or instrument,
      the rotor plate being rotatable about an axis of motion spaced apart from the rotor plate and having a path of rotation along a circumference of a circle centered on the axis of rotation,
   a base plate having bearing elements engaging with bearing surfaces of the rotor plate and supporting the rotor plate to allow the rotor plate to rotate about the axis of rotation, and
   a resilient bias mechanism engaging the roller plate to resiliently bias the roller plate into engagement with the base plate.

2. The precision adjustable goniometer of claim 1, further comprising:
   a drive mechanism coupling the rotor plate to the base plate to rotate the rotor plate along the path of rotation along the circumference of the circle centered on the axis of rotation.

3. The precision adjustable goniometer of claim 2, wherein the drive mechanism comprises:
   a drive roller frictionally engaging a bias surface of the roller plate.

4. The precision adjustable goniometer of claim 3, wherein the bias mechanism comprises:
   a bearing assembly supporting the drive roller and resiliently engaging the base plate by a bearing mount including a resilient element interacting with the base plate to resiliently bias the bearing assembly and the drive roller toward the base plate.

5. The precision adjustable goniometer of claim 3, wherein the bias mechanism comprises:
   a bearing assembly supporting the drive roller and resiliently engaging the base plate by a bearing mount including a bushing of resilient material located between the base plate and the and bearing assembly, thereby resiliently biasing the bearing assembly and the drive roller toward the base plate.

6. The precision adjustable goniometer of claim 2, wherein the drive mechanism comprises:
   a pinion gear mounted onto a driven shaft mounted to the base plate, and
   a rack mounted to the bias surface of the rotor plate.

7. The precision adjustable goniometer of claim 6, wherein the bias mechanism comprises:
   a bearing assembly supporting the drive roller and resiliently engaging the base plate by a bearing mount including a resilient element interacting with the base plate to resiliently bias the bearing assembly and the drive roller toward the base plate.

8. The precision adjustable goniometer of claim 6, wherein the bias mechanism comprises:
   a bearing assembly supporting the drive roller and resiliently engaging the base plate by a bearing mount including a bushing of resilient material located between the base plate and the and bearing assembly, thereby resiliently biasing the bearing assembly and the drive roller toward the base plate.

9. The precision adjustable goniometer of claim 2, wherein the bias mechanism comprises:
   a bearing assembly supporting the drive roller and resiliently engaging the base plate by a bearing mount including a bushing of resilient material located between the base plate and the and bearing assembly, thereby resiliently biasing the bearing assembly and the drive roller toward the base plate.

10. The precision adjustable goniometer of claim 1, further comprising a drive mechanism, the drive mechanism comprising:
    a threaded drive screw engaging an actuator flag extending from the roller plate along a radius of the axis of rotation to cause axial motion of the actuator flag along the rotating threaded drive screw and corresponding rotation of the rotor plate along the path of rotation along the circumference of the circle centered on the axis of rotation.

11. The precision adjustable goniometer of claim 10, wherein the bias mechanism comprises:
    a bearing assembly supporting the drive roller and resiliently engaging the base plate by a bearing mount including a resilient element interacting with the base plate to resiliently bias the bearing assembly and the drive roller toward the base plate.

12. The precision adjustable goniometer of claim 10, wherein the bias mechanism comprises:
   a bearing assembly supporting the drive roller and resiliently engaging the base plate by a bearing mount including a bushing of resilient material located between the base plate and the and bearing assembly, thereby resiliently biasing the bearing assembly and the drive roller toward the base plate.

13. The precision adjustable goniometer of claim 1, further comprising an anti-backlash drive mechanism, the drive mechanism comprising:
   an actuator flag extending from the roller plate generally along a radius passing through axis of rotation,
   a drive screw generally tangent to and spaced apart from the circumference of the circle defined by the rotational path of rotor plate and oriented at an oblique angle with respect to the actuator flag,
   a lead nut located on a first side of the actuator flag, the lead nut being non-rotationally coupled to the drive screw and axially translatable along the drive screw by rotation of the drive screw, and
   a compression spring and a plunger located on a second side of the actuator flag and coaxial with the drive screw, a first end of the compression spring exerting a resilient bias force on the plunger and the plunger exerting the resilient bias force on the second side of the actuator flag and a second end of the compression spring bearing against a rest axially fixed with respect to the drive screw.

14. The precision adjustable goniometer of claim 13, wherein at least one of mating faces of at least one of the actuator flag and the plunger and at least one of the actuator flag and lead nut are curved to permit smooth rotation along at least one of the mating faces of at least one of the actuator flag and the plunger and at least one of the actuator flag and lead nut.

15. The precision adjustable goniometer of claim 1, further comprising an anti-backlash drive mechanism, the drive mechanism comprising:
   an actuator flag extending from the roller plate generally along a radius passing through axis of rotation,
   a drive screw generally tangent to and spaced apart from the circumference of the circle defined by the rotational path of rotor plate and oriented at an oblique angle with respect to the actuator flag,
   a lead nut located on a first side of the actuator flag, the lead nut being non-rotationally coupled to the drive screw and axially translatable along the drive screw by rotation of the drive screw, and
   a pre-load spring and a non-rotating sleeve located on a second side of the actuator flag and coaxial with the drive screw, a first end of the pre-load spring exerting a resilient bias force on the non-rotating sleeve and the non-rotating sleeve exerting the resilient bias force on the second side of the actuator flag and a second end of the pre-load spring bearing against a take-up slave nut restrained from rotation with the drive screw.

16. The precision adjustable goniometer of claim 15, wherein at least one of mating faces of at least one of the actuator flag and the non-rotating sleeve and at least one of the actuator flag and lead nut are curved to permit smooth rotation along at least one of the mating faces of at least one of the actuator flag and the non-rotating sleeve and at least one of the actuator flag and lead nut.

* * * * *